United States Patent [19]

Drori

[11] Patent Number: 5,030,349
[45] Date of Patent: Jul. 9, 1991

[54] FILTER APPARATUS

[76] Inventor: Mordeki Drori, POB 21538, Tel Aviv, Israel

[21] Appl. No.: 462,642

[22] Filed: Jan. 9, 1990

[30] Foreign Application Priority Data

Jan. 12, 1989 [IL] Israel .................................. 88940

[51] Int. Cl.⁵ ............................................. B01D 21/02
[52] U.S. Cl. .................................. 210/411; 210/486; 210/489; 210/492; 210/347
[58] Field of Search ............... 210/411, 412, 489, 346, 210/347, 486, 492

[56] References Cited

U.S. PATENT DOCUMENTS

| | | | |
|---|---|---|---|
| Re. 21,107 | 5/1939 | Seitz | 210/188 |
| Re. 26,709 | 11/1969 | Linden et al. | 210/500 |
| Re. 32,537 | 11/1987 | Drori | 210/107 |
| 226,271 | 4/1880 | Blaisdell | 210/488 |
| 327,646 | 10/1885 | Bingham, Jr. | 210/497.01 |
| 428,307 | 5/1890 | Leland | 210/488 |
| 623,324 | 4/1899 | Levi | 210/329 |
| 730,485 | 6/1903 | Simoneton | 210/488 |
| 836,306 | 11/1906 | Cunning | 137/489 |
| 913,636 | 2/1909 | Gardiner | 210/497.01 |
| 1,098,616 | 6/1914 | Creveling | 137/489 |
| 1,349,042 | 5/1932 | Pickard | 210/108 |
| 1,496,771 | 6/1924 | Cash | 210/497.01 |
| 1,581,998 | 4/1926 | Fulcher | 210/492 |
| 1,602,647 | 10/1926 | Carr | 127/512.3 |
| 1,642,864 | 9/1927 | Williams | 210/488 |
| 1,643,299 | 9/1927 | Furness | 210/488 |
| 1,673,743 | 6/1928 | Fulcher | 210/415 |
| 1,719,346 | 7/1929 | Thompson | 210/169 |
| 1,797,399 | 3/1931 | Boulade | 210/169 |
| 1,804,512 | 5/1931 | Pickard | 210/492 |
| 1,852,873 | 4/1932 | Berger | 210/321 |
| 1,906,391 | 5/1932 | McKinley | 210/413 |
| 1,926,557 | 9/1933 | Perkins | 210/167 |
| 1,929,246 | 10/1933 | Hechenberkner | 183/50 |
| 1,955,903 | 4/1934 | Cammen | 210/130 |
| 1,976,547 | 10/1934 | Dumas | 210/169 |
| 1,992,101 | 2/1935 | Stuart | 210/165 |
| 1,994,656 | 3/1935 | Liddell | 210/167 |
| 2,031,165 | 2/1936 | Johnson | 210/181 |
| 2,137,556 | 11/1938 | Young | 210/488 |
| 2,178,463 | 10/1939 | Bahnson | 183/53 |
| 2,305,351 | 12/1942 | Hellan | 210/167 |
| 2,330,945 | 10/1943 | Becker | 210/169 |
| 2,338,417 | 2/1940 | Forrest et al. | 210/167 |
| 2,338,418 | 1/1944 | Forrest et al. | 210/167 |
| 2,338,419 | 1/1944 | Forrest et al. | 210/167 |
| 2,365,525 | 12/1944 | Cox | 210/167 |
| 2,374,756 | 5/1945 | Kisch et al. | 210/170 |
| 2,387,364 | 10/1945 | Terry | 137/153 |

(List continued on next page.)

FOREIGN PATENT DOCUMENTS

| | | |
|---|---|---|
| 16248 | 10/1928 | Australia . |
| 113021 | 5/1941 | Australia . |
| 126722 | 2/1948 | Australia . |
| 156599 | 5/1954 | Australia . |
| 156721 | 5/1954 | Australia . |
| 275874 | 4/1965 | Australia . |
| 52363/64 | 6/1967 | Australia . |
| 570494 | 3/1985 | Australia . |

(List continued on next page.)

OTHER PUBLICATIONS

Spielman, Lloyd A., "Particle Capture from Low-Speed Laminar Flows", Am. Rev. Fluid Mech., 1977, 9:297-319.

Primary Examiner—Bernard Nozick
Attorney, Agent, or Firm—Pearne, Gordon, McCoy & Granger

[57] ABSTRACT

A fluid filter including a housing defining a fluid inlet and a fluid outlet and a filter element defining an upstream surface communicating with the fluid inlet and a downstream surface communicating with the fluid outlet, the filter element including at least one group of disk-like elements including at least one element of relatively fine porous material, having disposed on both sides thereof disk like elements of a relatively coarse porous material, each of the at least one groups having disposed on both sides thereof a grooved spacer element.

19 Claims, 3 Drawing Sheets

U.S. PATENT DOCUMENTS

| | | | |
|---|---|---|---|
| 2,422,735 | 6/1947 | La Guardia | 210/117 |
| 2,455,486 | 12/1948 | Hicks | 210/169 |
| 2,495,095 | 1/1950 | Ewbank | 210/169 |
| 2,507,827 | 6/1950 | Stafford | 183/44 |
| 2,508,602 | 5/1950 | Goetz | 210/203 |
| 2,519,506 | 8/1950 | Russell | 210/183 |
| 2,554,016 | 5/1951 | Czarnecki | 210/492 |
| 2,557,375 | 6/1951 | Dickenson | 210/167 |
| 2,575,995 | 11/1951 | Briggs | 210/183 |
| 2,583,423 | 1/1952 | Halinan | 210/185 |
| 2,608,952 | 9/1952 | Herbert | 119/159 |
| 2,609,832 | 9/1952 | Smith | 137/489 |
| 2,631,732 | 3/1953 | Vocelka | 210/492 |
| 2,654,440 | 10/1953 | Robinson | 210/492 |
| 2,665,813 | 1/1954 | Bollaert | 210/203 |
| 2,670,760 | 3/1954 | Erikson | 137/625 |
| 2,670,851 | 3/1954 | Curtis | 210/120 |
| 2,670,851 | 3/1954 | Curtis | 210/120 |
| 2,692,686 | 10/1954 | Fleck | 210/488 |
| 2,696,306 | 12/1954 | Gomery | 220/425 |
| 2,702,637 | 2/1955 | Shepard | 210/492 |
| 2,742,158 | 4/1956 | Schuller | 210/152 |
| 2,757,802 | 8/1956 | Schmid | 210/169 |
| 2,758,877 | 4/1956 | Gleason | 137/872 |
| 2,768,751 | 10/1956 | Booth | 210/169 |
| 2,793,753 | 5/1957 | Webster | 210/153 |
| 2,847,126 | 8/1958 | Goodman | 210/411 |
| 2,843,236 | 7/1958 | Anderson | 210/236 |
| 2,855,106 | 10/1958 | English | 210/492 |
| 2,873,030 | 2/1959 | Ashton | 210/488 |
| 2,889,048 | 6/1959 | Nordin | 210/409 |
| 2,892,240 | 6/1959 | Frankenhoff | 25/157 |
| 2,907,466 | 10/1959 | Beddow | 210/457 |
| 2,920,690 | 1/1960 | Wright | 158/36.3 |
| 2,926,137 | 2/1960 | Calvert | 210/500 |
| 2,946,447 | 7/1960 | Weltz | 210/333 |
| 2,956,016 | 10/1960 | Leppla | 210/503 |
| 2,978,108 | 4/1961 | Strassheim | 210/488 |
| 3,005,556 | 10/1961 | Jensen | 210/488 |
| 3,018,791 | 1/1962 | Knox | 137/458 |
| 3,037,637 | 6/1962 | Bub | 210/487 |
| 3,048,276 | 8/1962 | Darnell | 210/304 |
| 3,061,102 | 10/1962 | Mayer, Jr. | 210/412 |
| 3,105,042 | 9/1963 | Roosa | 210/94 |
| 3,111,963 | 11/1963 | Brockwell | 210/492 |
| 3,149,070 | 9/1964 | Nash | 210/169 |
| 3,151,071 | 9/1964 | Kasten | 210/488 |
| 3,195,730 | 7/1965 | Muller | 210/448 |
| 3,221,888 | 12/1965 | Muller | 210/333 |
| 3,233,741 | 2/1966 | Bell | 210/500 |
| 3,272,342 | 9/1966 | McLaren et al. | 210/440 |
| 3,273,374 | 9/1966 | Annett | 72/340 |
| 3,278,040 | 10/1966 | Goldberg | 210/500 |
| 3,282,435 | 11/1966 | Goldberg | 210/500 |
| 3,322,281 | 5/1967 | Gulick | 210/134 |
| 3,323,963 | 6/1967 | Summers | 156/192 |
| 3,330,414 | 7/1967 | Micky | 210/236 |
| 3,335,869 | 8/1967 | Hedges | 210/500 |
| 3,338,416 | 8/1967 | Barry | 210/297 |
| 3,355,021 | 11/1967 | Jones | 210/130 |
| 3,369,665 | 2/1968 | Paulson | 210/94 |
| 3,370,712 | 2/1968 | Smith | 210/492 |
| 3,382,982 | 5/1968 | Stevens | 210/184 |
| 3,397,793 | 8/1968 | MacDonnell | 210/457 |
| 3,397,794 | 8/1968 | Toth et al. | 210/488 |
| 3,400,734 | 9/1968 | Rosenberg | 137/495 |
| 3,445,002 | 9/1967 | Muller | 210/108 |
| 3,448,862 | 6/1969 | Kudlaty | 210/488 |
| 3,460,557 | 8/1969 | Gallant | 137/82 |
| 3,473,668 | 10/1969 | Bunyard | 210/492 |
| 3,493,113 | 2/1970 | Rosaen | 210/108 |
| 3,494,376 | 2/1970 | Doeringsfeld et al. | 137/624.14 |
| 3,503,511 | 3/1970 | Spitzberg | 210/232 |
| 3,511,374 | 5/1970 | Beal | 209/258 |
| 3,521,850 | 7/1970 | German | 251/28 |
| 3,536,200 | 10/1970 | Gigliotti | 210/345 |
| 3,561,602 | 2/1971 | Molitor | 210/266 |
| 3,574,509 | 4/1971 | Zentis | 210/108 |
| 3,622,003 | 11/1971 | Czech | 210/108 |
| 3,631,887 | 1/1972 | Schlechtriem et al. | 137/522 |
| 3,638,905 | 1/1972 | Ferris | 251/94 |
| 3,647,084 | 3/1972 | Martin | 210/492 |
| 3,648,843 | 3/1972 | Pearson | 210/443 |
| 3,666,107 | 5/1972 | Boggs | 210/483 |
| 3,679,052 | 7/1972 | Asper | 210/75 |
| 3,703,465 | 11/1972 | Reese et al. | 210/333 |
| 3,717,252 | 2/1973 | Picard | 210/108 |
| 3,722,681 | 3/1973 | Booruiy | 210/108 |
| 3,722,851 | 3/1973 | Love | 251/54 |
| 3,788,593 | 1/1974 | Cohen | 251/48 |
| 3,789,990 | 2/1974 | Drori | 210/318 |
| 3,859,216 | 1/1975 | Sisson et al. | 210/440 |
| 3,882,025 | 5/1975 | Talley, Jr. | 210/354 |
| 3,890,232 | 6/1975 | Combest et al. | 210/223 |
| 3,957,636 | 5/1976 | Arvanitakis | 210/67 |
| 3,959,140 | 5/1976 | Legras | 210/107 |
| 3,994,810 | 11/1976 | Schaeffer | 210/103 |
| 4,026,806 | 5/1977 | Drori | 210/405 |
| 4,039,457 | 8/1977 | Schacht et al. | 210/493 |
| 4,042,504 | 8/1977 | Drori | 210/107 |

(List continued on next page.)

FOREIGN PATENT DOCUMENTS

| | | |
|---|---|---|
| 50717/85 | 7/1986 | Australia . |
| 51427/85 | 9/1986 | Australia . |
| 582431 | 10/1986 | Australia . |
| 578001 | 1/1987 | Australia . |
| 578401 | 1/1987 | Australia . |
| 549633 | 12/1957 | Canada . |
| 586111 | 1/1959 | Canada . |
| 0057670 | 8/1982 | European Pat. Off. . |
| 205407A3 | 2/1986 | European Pat. Off. . |
| 0177434 | 9/1986 | European Pat. Off. . |
| 0267866 | 5/1988 | European Pat. Off. . |
| 0284729 | 10/1988 | European Pat. Off. . |
| 846245 | 8/1952 | Fed. Rep. of Germany . |
| 1007743 | 6/1957 | Fed. Rep. of Germany . |
| 1064746 | 4/1967 | United Kingdom . |
| 1289827 | 2/1969 | Fed. Rep. of Germany . |
| 1909129 | 9/1970 | Fed. Rep. of Germany . |
| 1751562 | 4/1971 | Fed. Rep. of Germany . |
| 2054291 | 5/1971 | Fed. Rep. of Germany . |

(List continued on next page.)

U.S. PATENT DOCUMENTS

| | | | |
|---|---|---|---|
| 4,045,345 | 8/1977 | Drori | 210/107 |
| 4,048,067 | 9/1977 | Cheng | 210/73 |
| 4,060,483 | 11/1977 | Barzuza | 210/79 |
| 4,062,774 | 12/1977 | Hinojosa | 210/194 |
| 4,067,812 | 1/1978 | Drori | 210/310 |
| 4,082,057 | 2/1978 | Hayes | 118/9 |
| 4,115,274 | 9/1978 | Boddeker | 210/321 |
| 4,119,540 | 5/1980 | Custo, Jr. | 210/232 |
| 4,120,794 | 10/1978 | Taylor | 210/345 |
| 4,156,651 | 5/1979 | Mehoudar | 210/108 |
| 4,204,961 | 5/1980 | Cusato, Jr. | 210/232 |
| 4,207,181 | 1/1980 | Drori | 210/310 |
| 4,213,861 | 7/1980 | Muller et al. | 210/82 |
| 4,235,723 | 11/1980 | Bartlett, Jr. | 210/321 |
| 4,251,374 | 2/1981 | Cunningham | 210/232 |
| 4,267,042 | 5/1981 | Holmann | 210/169 |
| 4,267,045 | 5/1981 | Hoof | 210/322 |
| 4,271,018 | 6/1981 | Drori | 210/107 |
| 4,278,540 | 6/1981 | Drori | 210/107 |
| 4,284,500 | 8/1981 | Keck | 209/250 |
| 4,288,330 | 9/1981 | Strub | 210/777 |
| 4,295,963 | 10/1981 | Drori | 210/108 |
| 4,297,209 | 10/1981 | DeVisser et al. | 210/107 |
| 4,299,699 | 11/1981 | Boogay | 210/143 |
| 4,308,142 | 12/1981 | Braukmann | 210/355 |
| 4,312,374 | 7/1981 | Drori | 137/469 |
| 4,402,829 | 9/1983 | Cordua | 210/333.01 |
| 4,410,430 | 10/1983 | Hagler | 210/446 |
| 4,430,232 | 2/1984 | Doucet | 210/798 |
| 4,435,287 | 3/1984 | Sumimoto | 210/131 |
| 4,462,916 | 7/1984 | Ecabert | 210/798 |
| 4,468,319 | 8/1984 | Laakso | 210/197 |
| 4,481,111 | 11/1984 | Christophe | 210/333.01 |
| 4,495,068 | 1/1985 | Rosaen | 210/91 |
| 4,517,089 | 5/1985 | Armand | 210/488 |
| 4,552,655 | 11/1985 | Granot | 210/108 |
| 4,552,662 | 11/1985 | Webster | 210/232 |
| 4,572,784 | 2/1986 | Drori | 210/133 |
| 4,582,603 | 4/1986 | Nasse | 210/323.2 |
| 4,592,838 | 6/1986 | Christophe et al. | 210/323.1 |
| 4,592,839 | 6/1986 | Rosenberg | 210/352 |
| 4,614,581 | 9/1986 | Drori | 210/108 |
| 4,624,785 | 10/1986 | Drori | 210/414 |
| 4,632,757 | 12/1986 | Rosenberg | 210/411 |
| 4,642,182 | 2/1987 | Drori | 210/232 |
| 4,642,188 | 2/1987 | DeVisser et al. | 210/333.1 |
| 4,654,143 | 3/1987 | Drori | 210/232 |
| 4,655,910 | 4/1987 | Tabor | 210/107 |
| 4,655,911 | 4/1987 | Tabor | 210/107 |
| 4,683,060 | 7/1987 | Drori | 210/448 |
| 4,689,148 | 8/1987 | Timm et al. | 210/321.1 |
| 4,704,207 | 11/1987 | Chu | 210/347 |
| 4,707,258 | 11/1987 | Drori | 210/333.1 |
| 4,726,900 | 2/1988 | Keskinen et al. | 210/488 |
| 4,732,673 | 3/1988 | Dagard et al. | 210/247 |
| 4,735,730 | 4/1988 | Bratten | 210/741 |
| 4,740,302 | 4/1988 | Rosenberg | 210/392 |
| 4,744,901 | 5/1988 | Drori | 210/323.1 |
| 4,751,000 | 6/1988 | Drori | 210/448 |
| 4,753,731 | 6/1988 | Drori | 210/492 |
| 4,762,615 | 8/1988 | Drori | 210/333.01 |
| 4,762,615 | 8/1988 | Drori | 210/412 |
| 4,781,825 | 11/1988 | Grimes et al. | 210/107 |
| 4,824,564 | 4/1989 | Edwards et al. | 210/232 |
| 4,824,564 | 4/1989 | Edwards et al. | 210/487 |
| 4,844,806 | 7/1989 | Drori | 210/448 |
| 4,863,598 | 9/1989 | Drori | 210/232 |
| 4,871,457 | 10/1989 | Drori | 210/333.1 |
| 4,902,420 | 2/1990 | Pall et al. | 210/346 |
| 4,935,126 | 6/1990 | Drori | 210/411 |

FOREIGN PATENT DOCUMENTS

| | | |
|---|---|---|
| 1461491 | 7/1971 | Fed. Rep. of Germany . |
| 1436277 | 1/1972 | Fed. Rep. of Germany . |
| 1536776 | 11/1972 | Fed. Rep. of Germany . |
| 1536796 | 11/1972 | Fed. Rep. of Germany . |
| 2161703 | 6/1973 | Fed. Rep. of Germany . |
| 2517635 | 1/1976 | Fed. Rep. of Germany . |
| 2453445 | 5/1976 | Fed. Rep. of Germany . |
| 2616915 | 1/1977 | Fed. Rep. of Germany . |
| 2629848 | 1/1977 | Fed. Rep. of Germany . |
| 3044843 | 9/1981 | Fed. Rep. of Germany . |
| 2335214 | 10/1981 | Fed. Rep. of Germany . |
| 2629151 | 10/1982 | Fed. Rep. of Germany . |
| 3247440 | 7/1984 | Fed. Rep. of Germany . |
| 8438393 | 2/1986 | Fed. Rep. of Germany . |
| 2645948 | 1/1987 | Fed. Rep. of Germany . |
| 1157358 | 5/1958 | France . |
| 899337 | 9/1965 | France . |
| 1543176 | 1/1968 | France . |
| 38236 | 11/1971 | Israel . |
| 40046 | 8/1972 | Israel . |
| 49875 | 6/1976 | Israel . |
| 68288 | 6/1983 | Israel . |
| 68935 | 6/1983 | Israel . |
| 69638 | 9/1983 | Israel . |
| 73164 | 1/1984 | Israel . |
| 73165 | 10/1984 | Israel . |
| 75110 | 5/1984 | Israel . |
| 75822 | 10/1984 | Israel . |
| 77132 | 1/1985 | Israel . |
| 77317 | 12/1985 | Israel . |
| 47331 | 7/1952 | Italy . |
| 63142 | 1/1941 | Norway . |
| 10814 | 7/1884 | United Kingdom . |
| 563832 | 8/1944 | United Kingdom . |
| 588991 | 1/1947 | United Kingdom . |
| 841207 | 7/1960 | United Kingdom . |
| 951404 | 3/1964 | United Kingdom . |
| 2037601 | 3/1983 | United Kingdom . |

FILTER APPARATUS

FIELD OF THE INVENTION

The present invention relates to filters and particularly to multiple-disk type filters useful in filtering particles from water and in many other applications.

BACKGROUND OF THE INVENTION

Multiple-disk type filters generally include a housing in which the filter body within the housing is in the form of a stack of centrally-apertured, filter disks.

Back-flushable filters of various types are well known in the art for a great variety of applications. A particularly successful type of backflushable filter employing filter disks is described and claimed in the following patents of applicant: U.S. Pat. Nos. 4,026,806; 4,042,504; 4,045,345; 4,271,018; 4,295,963.

SUMMARY OF THE INVENTION

There is provided in accordance with a preferred embodiment of the invention a fluid filter including a housing defining a fluid inlet and a fluid outlet and a filter element defining an upstream surface communicating with the fluid inlet and a downstream surface communicating with the fluid outlet, the filter element including at least one group of disk-like elements including at least one element of relatively fine porous material, having disposed on both sides thereof disk like elements of a relatively coarse porous material, each of the at least one groups having disposed on both sides thereof a grooved spacer element.

According to a preferred embodiment of the present invention, each of the grooved spacer elements has formed thereupon axially tapered generally radially extending grooves.

Further in accordance with a preferred embodiment of the present invention, the filter also includes in communication with the fluid outlet filter means for trapping portions of the relatively coarse porous material which may have entered the filtered fluid.

Still further in accordance with a preferred embodiment of the present invention, each of the spacer elements has formed on a first side thereof axially tapered generally radially extending grooves opening to the downstream surface of the filter element and has formed on a second side thereof axially tapered generally radially extending opening to the upstream surface of the filter element.

Additionally in accordance with a preferred embodiment of the present invention, the grooves on the first side of each individual one of the spacer elements are skewed with respect to the grooves on the second side of the individual one of the spacer elements.

Further in accordance with a preferred embodiment of the present invention, each of the grooves formed on a side of a first one of the spacer elements, the first spacer element being disposed on a first side of an individual one of the at least one groups, which side of the first spacer element faces the first side of the group, overlaps at least two of the grooves formed on a side of a second one of the spacer elements, the second spacer element being disposed on a second side of the group, the side of the second spacer element facing the second side of the group.

Still further in accordance with a preferred embodiment of the present invention, each of the grooves is terminated at a first of the two ends defined thereby, thus requiring all fluid to be filtered to pass through the porous material, and wherein an opening is defined at a second of the two ends defined by the groove.

Further in accordance with a preferred embodiment of the present invention, the grooves on each side of each spacer element are defined by upstanding portions of non-uniform height, the height of each upstanding portion tapering downward from a maximum adjacent the opening of the grooves on the side of the spacer element.

Additionally in accordance with a preferred embodiment of the present invention, each of the spacer elements includes first and second sides, there being defined first and second peripheral sealing rims on the first side of the spacer element and third and fourth peripheral sealing rims on the second side of the spacer element for providing sealing engagement of the spacer element with the porous material interposed between the spacer element and adjacent stacked spacer elements, whereby fluid entering an individual one of the grooves at the upstream surface of the filter element during normal filtering may only exit the groove via the porous material to the downstream surface of the filter element and whereby fluid entering a groove at the downstream surface of the filter element during backflushing can only exit the groove via the porous material to the upstream surface of the filter element.

Further in accordance with a preferred embodiment of the present invention, the first and second rims are located at respective upstream and downstream radial locations on the first side of the spacer element and the third and fourth rims are located at respective upstream and downstream radial locations on the second side of the spacer element, the third and fourth rims each being radially offset outwardly with respect to the respective the first and second rims, such that, when the filter element is assembled, for any two adjacent spacer elements with an individual one of the at least one groups of disk-like elements interposed therebetween, the first rim on a first of the two adjacent spacer elements lies in adjacent relationship with the third rim on a second of the two adjacent spacer elements on opposite sides of the group, and the second rim on the first of the two adjacent spacer elements lies in adjacent relationship with the fourth rim on the second of the two adjacent spacer elements on opposite sides of the group.

Further in accordance with a preferred embodiment of the present invention, the sealing rims on an individual side of an individual spacer element are generally coplanar with the upstanding portions adjacent thereto.

Still further in accordance with a preferred embodiment of the present invention, the first, second, third and fourth rims lie opposite the upstanding portions.

Additionally in accordance with a preferred embodiment of the present invention, the filter also includes backflushing means including means for providing a concentrated, relatively high pressure flow of backflushing liquid to the filter element directed from the downstream side thereof to the upstream side thereof, the backflushing means being arranged to be movable axially, parallel to a longitudinal axis defined by the filter element such that the relatively high pressure flow sequentially engages different regions of the filter element for sequential backflushing thereof.

The above embodiment enables fluid passing through the filter element during normal filtering operation to enter through any given groove and, after passing, through the porous material, to drain from the filter element through a plurality of channels, thus enabling clogged or blocked channels to be bypassed and greatly enhancing the filtration capacity of the filter element.

The above arrangement also enables backflushing fluid passing through the filter element during backflushing operation to enter from the downstream side at any given groove and after passing through the porous material to drain from the filter element through a plurality of channels, thus increasing the efficiency of backflushing operation.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
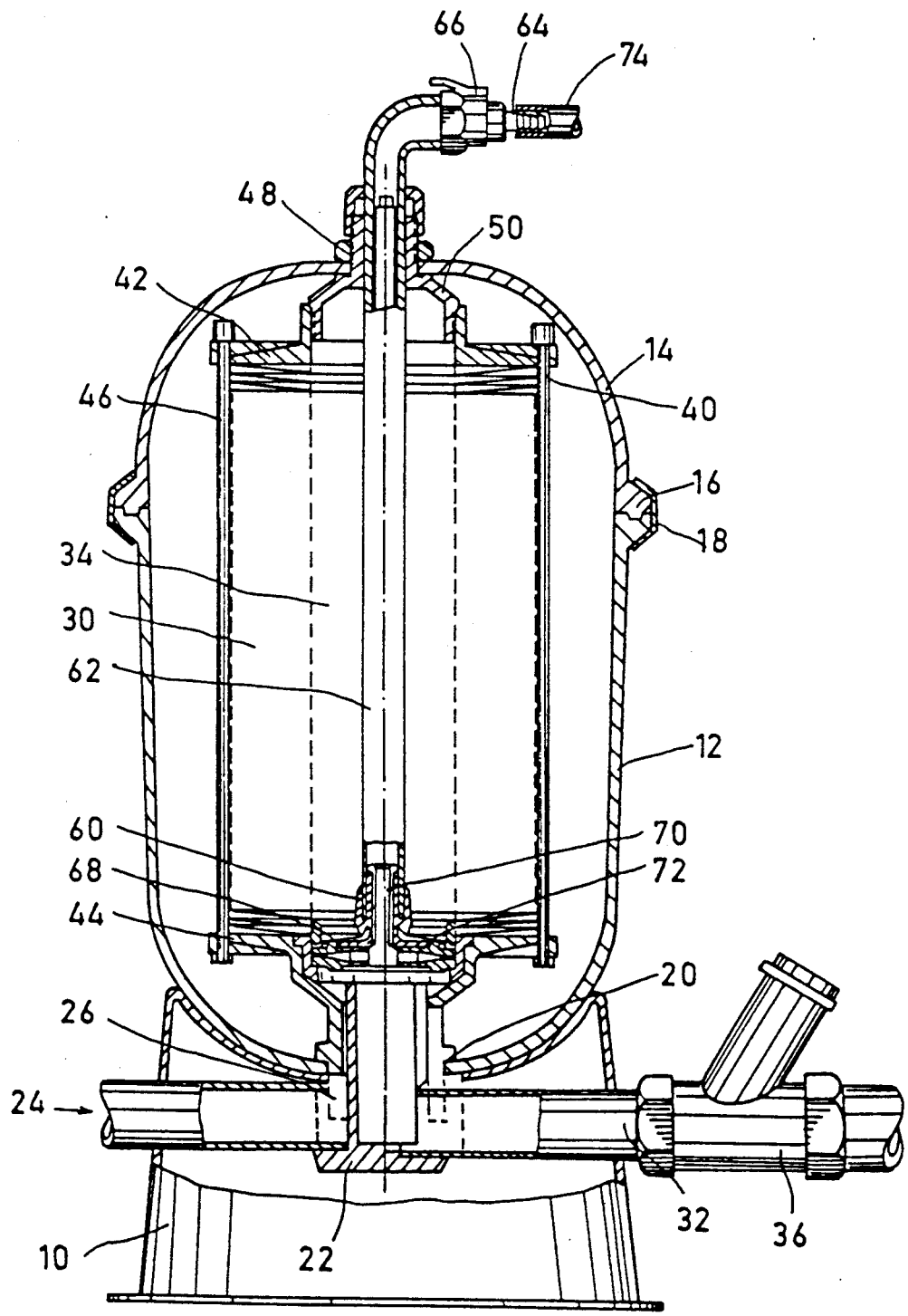
FIG. 1 is a partially cut-away side view sectional illustration of a filter constructed and operative in accordance with an embodiment of the present invention in a first operative orientation.

Reference is now made to FIG. 1 which illustrates a filter constructed and operative in accordance with a preferred embodiment of the present invention and comprising a base 10 on which is fixedly supported a bottom housing portion 12. Removably mounted onto the bottom housing portion 12 is a top housing portion 14, which is maintained in sealing engagement therewith by means of a sealing ring 16 and clamping band 18. The bottom housing portion 12 typically comprises an inlet and outlet opening 20 with which is associated an inlet and outlet manifold 22.

A fluid inlet 24 communicates via an inlet pathway 26 in manifold 22 with the outside cylindrical surface, hereinafter termed the "upstream surface" of a filter element 30. A fluid outlet 32 communicates with a hollow interior volume 34 of filter element 30 adjacent the inner cylindrical surface of the filter element, hereinafter termed the "downstream surface".

Figure 2:
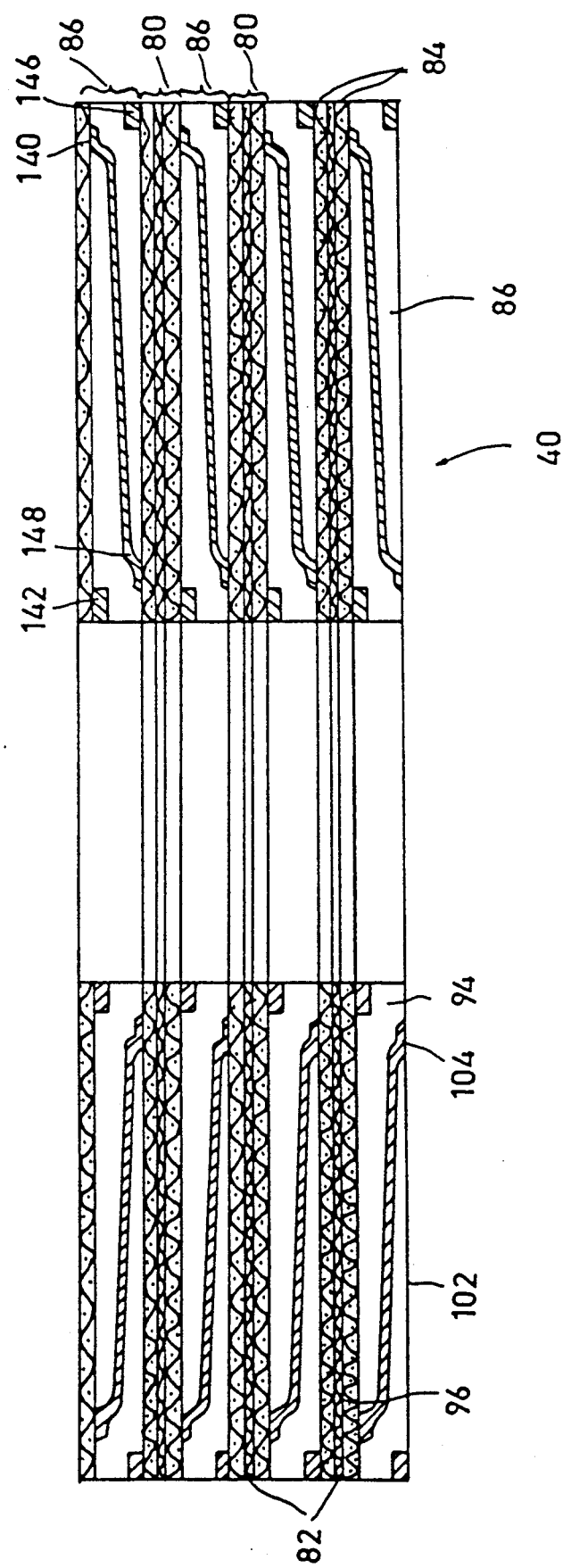
FIG. 2 is a sectional illustration of a stack of filter disks constructed and operative in accordance with a preferred embodiment of the invention.
Figure 3:
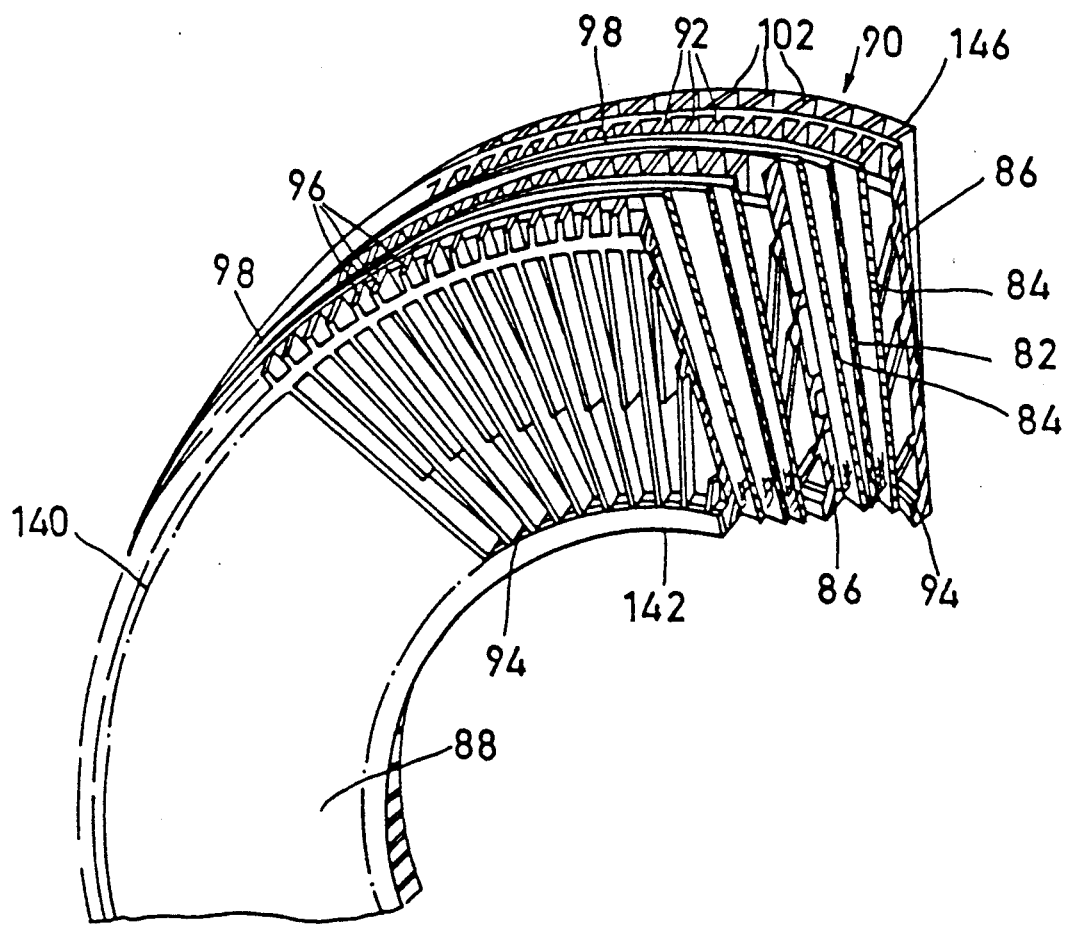
FIG. 3 is a pictorial illustration of a portion of the stack of filter disks illustrated in FIG. 3.

The filter element 30 preferably comprises a stack 40 of hollow center filter disks of the types illustrated in FIGS. 2 and 3 and including at least one group of disk-like elements including at least one element of relatively fine porous material, having disposed on both sides thereof disk like elements of a relatively coarse porous material, each group having disposed on both sides thereof a grooved spacer element.

The stack of filter disks 40 is preferably removably mounted in coaxial relationship so as to define volume 34 and is retained within the housing by means of top and bottom retaining collars 42 and 44. A plurality of threaded rods 46, typically four in number, may be employed to secure the stack of filter disks 40 in place. A cover retaining nut 48 serves to retain collar 42 via a support element 50 onto the top housing portion 14.

According to a preferred embodiment of the invention there is provided a conventional filter 36, such as a filter available from AMIAD of Israel, for filtering out of the fluid passing through fluid outlet 32 any particles or portions of the coarse filtering material.

It is noted that throughout the present specification and claims reference is made to fluid filtering. According to a preferred embodiment of the invention, the apparatus is adapted for filtering of liquids; however, it is also alternatively applicable for filtering of other fluids, such as gases.

A high pressure revolving spray nozzle assembly 60 is disposed mainly within volume 34 and comprises a water supply shaft 62 having a water inlet 64 and an associated inlet valve 66.

A rotating outlet head 68 is arranged for relatively free rotation about a rotation axis 70 defined in shaft 62 and includes at least one outlet aperture 72 which is typically arranged to provide a radially directed concentrated high pressure backflushing jet, which serves to flush particulate matter from the filter element 30.

Inlet 64 is typically coupled via a flexible hose 74 to a backflush liquid supply which may be connected to a pressurized source of liquid to be filtered (not shown).

Reference is now made to FIGS. 2 and 3 which illustrate a stack 40 of filter disks constructed and operative in accordance with a preferred embodiment of the invention. The stack of filter disks is suitable for use in any suitable filter apparatus, examples of which are described in the patents listed hereinabove.

According to a preferred embodiment of the invention, the stack 40 comprises a plurality of groups 80 of disk-like elements including at least one element 82 of relatively fine porous material, typically a material such as that available from GoreTex, U.S.A. and having submicron openings. According to a preferred embodiment of the invention there are disposed on both sides of element 82 disk-like elements 84 of a relatively coarse porous material, such as REMAY manufactured by DuPont, typically having openings of the order of at least one micron.

According to a preferred embodiment of the invention there are disposed on both sides of each group 80 grooved spacer elements 86.

It is specifically noted that the term "porous material", as used herein, also includes screen material of any suitable mesh size. It also includes single or multiple layer porous material with uniform or different pass through characteristics.

Spacer elements 86 preferably define axially tapered generally radially extending grooves. It is a particular feature of the present invention that the generally radially extending grooves are normally not all precisely radial, for reasons which will now be described.

Specifically considering spacer disks 86, it is seen that the disks 86 define two opposite grooved surfaces, which will be termed, for convenience, surfaces 88 and 90 (FIG. 3). The grooves on surface 88 are defined by a plurality of tapered generally radially extending upstanding portions 92, which portions are formed on surface 88. Each portion 92 is of varying height, the height extending from a maximum at the inner edge 94 of the spacer disk and tapering down to a minimum adjacent a raised peripheral portion 96 lying alongside the outer edge 98 of the spacer disk.

The grooves on surface 90 are defined by a plurality of tapered generally radially extending upstanding portions 102, which portions are formed on surface 90. Each portion 102 is of varying height, extending to a maximum at the outer edge 98 of the spacer disk and tapering down to a minimum adjacent a raised peripheral portion (not shown) lying alongside the inner edge 94 of the spacer disk.

In order to provide maximum structural strength to spacer disk 86, it is preferred but not essential that the upstanding portions 92 and 102, which overlie each other, be somewhat skewed with respect to each other, such that upstanding portion 92 diagonally overlies upstanding portion 102. This arrangement enables the planar portion 120 of the spacer disk 86 to be made very thin. In this arrangement, one or both of the upstanding portions 92 and 102 are non-radial. Nevertheless, in view of their generally radial orientation, such an arrangement is being defined throughout as providing generally radially extending grooves.

It is seen that the arrangement is symmetric with respect to upstream and downstream surfaces of a filter element constituted from a stack of such filter disks, in that both surfaces are defined by an array of tapered grooves which serve to collect dirt upstream of the group of porous material elements.

According to a preferred embodiment, first and second peripheral sealing rims 140 and 142 are provided on a first side 88 of each spacer element 86, and third and fourth peripheral sealing rims 146 and 148 are provided on the opposite side 90 of the spacer element. The sealing rims 140, 142, 146 and 148 are operative to provide sealing engagement of the stacked spacer elements 86 with the porous material interposed therebetween, whereby fluid entering a groove at the upstream surface of the filter element during normal filtering may only exit the groove via the porous material to the downstream surface of the filter element. Fluid entering a groove at the downstream surface of the filter element during backflushing can only exit the groove via the porous material to the upstream surface of the filter element.

Preferably, the first and second rims 140 and 142 are located at respective upstream and downstream radial locations on the first side 88 of the spacer element and the third and fourth rims are located at respective upstream and downstream radial locations on the second side 90 of the spacer element. The third and fourth rims are each preferably radially offset outwardly with respect to the first and second rims respectively. When the filter stack 40 is assembled, for any two adjacent spacer elements 86 with a group 80 interposed therebetween, the first rim on a first of the two adjacent spacer elements lies in adjacent relationship with the third rim on a second of the two adjacent spacer elements on opposite sides of the group, and the second rim on the first of the two adjacent spacer elements lies in adjacent relationship with the fourth rim on the second of the two adjacent spacer elements on opposite sides of the group.

Typically, the sealing rims on each side of each spacer element 86 are generally coplanar with the upstanding portions 92 or 102 adjacent thereto and lie opposite upstanding portions defining grooves.

The above described structure provides extremely high quality sealing between the spacer disks 86 and the porous material elements in groups 80, while defining clear openings for both filtration and backflushing.

It will be appreciated by persons skilled in the art that the present invention is not limited by what has been shown and described hereinabove. Rather the scope of the present invention is defined solely by the claims which follow:

I claim:

1. A fluid filter comprising:
   a housing defining a fluid inlet and a fluid outlet; and
   a filter element defining an upstream surface communicating with the fluid inlet and a downstream surface communicating with the fluid outlet,
   the filter element comprising at least one group of disk elements including at least one element of relatively fine porous material, having disposed on both sides thereof disk elements of a relatively coarse porous material, each of said at least one group having disposed on both sides thereof a grooved spacer element.

2. A filter according to claim 1 and wherein each of said spacer elements has formed on a first side thereof axially tapered generally radially extending grooves opening to the downstream surface of said filter element and has formed on a second side thereof axially tapered generally radially extending grooves opening to the upstream surface of said filter element.

3. A filter according to claim 1 and also comprising backflushing means comprising means for providing a concentrated, relatively high pressure flow of backflushing liquid to the filter element directed from the downstream side thereof to the upstream side thereof, said backflushing means being arranged to be movable axially, parallel to a longitudinal axis defined by said filter element such that the relatively high pressure flow sequentially engages different regions of the filter element for sequential backflushing thereof.

4. A filter according to claim 1 and wherein each of said grooved spacer elements has formed thereupon axially tapered generally radially extending grooves.

5. A filter according to claim 4 and wherein each of said spacer elements has formed on a first side thereof axially tapered generally radially extending grooves opening to the downstream surface of said filter element and has formed on a second side thereof axially tapered generally radially extending grooves opening to the upstream surface of said filter element.

6. A filter according to claim 4 and also comprising in communication with the fluid outlet coarse filtering means for trapping portions of the relatively coarse porous material which may have entered the filtered fluid.

7. A filter according to claim 6 and wherein each of said spacer elements has formed on a first side thereof axially tapered generally radially extending grooves opening to the downstream surface of said filter element and has formed on a second side thereof axially tapered generally radially extending grooves opening to the upstream surface of said filter element.

8. A filter according to claim 6 and wherein the grooves on the first side of each individual one of said spacer elements are skewed with respect to the grooves on the second side of said individual one of said spacer elements.

9. A filter according to claim 6 and wherein each of the grooves formed on a side of a first one of said spacer elements, said first spacer element being disposed on a first side of an individual one of said at least one group, which side of said first spacer element faces said first side of said group, overlaps at least two of the grooves formed on a side of a second one of said spacer elements, said second spacer element being disposed on a second side of said group, the side of said second spacer element facing said second side of said group.

10. A filter according to claim 6 and wherein each of the grooves is terminated at a first of the two ends defined thereby, thus requiring all fluid to be filtered to pass through the porous material, and wherein an opening is defined at a second of the two ends defined by the groove.

11. A filter according to claim 4 and wherein each of the grooves is terminated at a first of the two ends defined thereby, thus requiring all fluid to be filtered to pass through the porous material, and wherein an opening is defined at a second of the two ends defined by the groove.

12. A filter according to claim 11 and wherein the grooves on each side of each spacer element are defined by upstanding portions of non-uniform height, the height of each upstanding portion tapering downward from a maximum adjacent the opening of the grooves on the side of the spacer element.

13. A filter according to claim 12 and wherein each of said spacer elements comprises first and second sides, there being defined first and second peripheral sealing rims on the first side of the spacer element and third and fourth peripheral sealing rims on the second side of the spacer element for providing sealing engagement of said spacer element with said porous material interposed between said spacer element and adjacent stacked spacer elements, whereby fluid entering an individual one of said grooves at the upstream surface of the filter element during normal filtering may only exit the groove via the porous material to the downstream surface of the filter element and whereby fluid entering a groove at the downstream surface of the filter element during backflushing can only exit the groove via the porous material to the upstream surface of the filter element.

14. A filter according to claim 13 and wherein said first and second rims are located at respective upstream and downstream radial locations on the first side of the spacer element and said third and fourth rims are located at respective upstream and downstream radial locations on the second side of the spacer element, said third and fourth rims each being radially offset outwardly with respect to the respective said first and second rims, such that, when the filter element is assembled, for any two adjacent spacer elements with an individual one of said at least one groups of disk-like elements interposed therebetween, the first rim on a first of the two adjacent spacer elements lies in adjacent relationship with the third rim on a second of the two adjacent spacer elements on opposite sides of the group, and the second rim on the first of the two adjacent spacer elements lies in adjacent relationship with the fourth rim on the second of the two adjacent spacer elements on opposite sides of the group.

15. A filter according to claim 14 and wherein said sealing rims on an individual side of an individual spacer element are generally coplanar with the upstanding portions adjacent thereto.

16. A filter according to claim 15 and wherein said first, second, third and fourth rims lie opposite said upstanding portions.

17. A filter according to claim 1 and also comprising in communication with the fluid outlet coarse filtering means for trapping portions of the relatively coarse porous material which may have entered the filtered fluid.

18. A filter according to claim 17 and wherein each of said spacer elements has formed on a first side thereof axially tapered generally radially extending grooves opening to the downstream surface of said filter element and has formed on a second side thereof axially tapered generally radially extending grooves opening to the upstream surface of said filter element.

19. A filter according to claim 17 and wherein each of the grooves is terminated at a first of the two ends defined thereby, thus requiring all fluid to be filtered to pass through the porous material, and wherein an opening is defined at a second of the two ends defined by the groove.

* * * * *